(12) United States Patent
Mantovani (10) Patent No.: US 9,738,126 B2
(45) Date of Patent: Aug. 22, 2017

(54) MECHANICAL COUPLING (HITCH) DEVICE FOR USE IN VEHICLES FOR TOWING TRAILERS

(71) Applicant: KEKO ACESSÓRIOS S.A., Flores da Cunha/RS (BR)

(72) Inventor: Juliano Scheer Mantovani, Rio Grande do Sul (BR)

(73) Assignee: KEKO ACESSÓRIOS S.A., Flores da Cunha (BR)

( * ) Notice: Subject to any disclaimer, the term of this patent is extended or adjusted under 35 U.S.C. 154(b) by 0 days.

(21) Appl. No.: 15/135,637

(22) Filed: Apr. 22, 2016

(65) Prior Publication Data

US 2016/0311281 A1    Oct. 27, 2016

(30) Foreign Application Priority Data

Apr. 24, 2015    (BR) .............................. 202015009289

(51) Int. Cl.
*B60D 1/28* (2006.01)
*B60D 1/52* (2006.01)
*B60D 1/06* (2006.01)
*B60D 1/48* (2006.01)
*B60D 1/62* (2006.01)

(52) U.S. Cl.
CPC ................. *B60D 1/28* (2013.01); *B60D 1/06* (2013.01); *B60D 1/065* (2013.01); *B60D 1/485* (2013.01); *B60D 1/52* (2013.01); *B60D 1/62* (2013.01)

(58) Field of Classification Search
CPC .......... B60D 1/06; B60D 1/065; B60D 1/241; B60D 1/28; B60D 1/485; B60D 1/488; B60D 1/52; B60D 1/60; B60D 1/62
See application file for complete search history.

(56) References Cited

U.S. PATENT DOCUMENTS

| 255,523 | A | * | 3/1882 | Lightburne | ........... F16L 37/252 |
| | | | | | 285/110 |
| 3,717,362 | A | * | 2/1973 | Johnson | ................... B60D 1/54 |
| | | | | | 280/164.1 |
| 3,768,837 | A | * | 10/1973 | Reese | .................... B60D 1/167 |
| | | | | | 280/495 |

(Continued)

FOREIGN PATENT DOCUMENTS

| DE | EP 0568921 A1 * 11/1993 | ............... B60D 1/52 |
| DE | EP 1184212 A2 * 3/2002 | ............... B60D 1/06 |

(Continued)

*Primary Examiner* — Joseph M Rocca
*Assistant Examiner* — Maurice L Williams
(74) *Attorney, Agent, or Firm* — Hodgson Russ LLP (57) ABSTRACT

A constructive arrangement in mechanical coupling device applied in vehicles for tow traction is described comprising a square tubular structure (10) arranged horizontally provided in its ends by through-holes (11) receiving the fastening fitting structures (20) next to the vehicle chassis, said square tubular structure (10) showing in the central portion a set of fastening through-holes (12) of a "T"-shaped structure (30) enabling to fit an end cap (40) in a sinuous shape, describing technical improvements by reducing the number of parts, simplifying the constructive process and fast coupling system between the bracket and the end cap, facilitating the use, manufacture, installation, and maintenance of the equipment.

8 Claims, 8 Drawing Sheets

(56) References Cited

U.S. PATENT DOCUMENTS

| | | | | |
|---|---|---|---|---|
| 5,102,156 A * | 4/1992 | Fink | B60D 1/485 | 280/495 |
| 5,242,186 A * | 9/1993 | Pettersson | B60D 1/52 | 280/491.5 |
| 5,513,622 A * | 5/1996 | Musacchia, Sr. | F16B 7/20 | 124/86 |
| 5,620,198 A * | 4/1997 | Borchers | B60D 1/52 | 280/491.5 |
| 6,139,044 A * | 10/2000 | Smith | B60D 1/247 | 280/500 |
| 6,189,910 B1 * | 2/2001 | Bartel | B60D 1/06 | 280/491.1 |
| 6,302,617 B1 * | 10/2001 | Rumpp | B60D 1/52 | 285/401 |
| 6,695,338 B1 * | 2/2004 | Roberts | B60D 1/06 | 280/491.5 |
| 7,004,492 B2 * | 2/2006 | Moss | B60D 1/07 | 280/456.1 |
| 7,338,062 B1 * | 3/2008 | Violette | B60D 1/40 | 280/478.1 |
| 7,850,192 B2 * | 12/2010 | Ceccarelli | B60D 1/40 | 280/478.1 |
| 8,091,913 B1 * | 1/2012 | White | B60D 1/06 | 280/456.1 |
| 2004/0104558 A1 * | 6/2004 | Williams | B60D 1/06 | 280/506 |
| 2006/0006626 A1 * | 1/2006 | Scruggs | B60D 1/06 | 280/495 |
| 2007/0063482 A1 * | 3/2007 | Binkowski | B60D 1/485 | 280/495 |
| 2007/0137266 A1 * | 6/2007 | Hsai | B60D 1/60 | 70/34 |
| 2008/0143125 A1 * | 6/2008 | Nees | B60D 1/56 | 293/117 |
| 2009/0014983 A1 * | 1/2009 | McKendry | B60D 1/241 | 280/506 |
| 2009/0206577 A1 * | 8/2009 | Kozuka | B60D 1/06 | 280/495 |
| 2009/0218788 A1 * | 9/2009 | Hughes | B60D 1/485 | 280/495 |
| 2010/0213688 A1 * | 8/2010 | Kuzara | B60D 1/52 | 280/495 |
| 2011/0109063 A1 * | 5/2011 | Fudala | B60D 1/485 | 280/497 |
| 2011/0156369 A1 * | 6/2011 | Schroder | B60D 1/06 | 280/491.1 |
| 2012/0112433 A1 * | 5/2012 | Williams, Jr. | B60D 1/04 | 280/490.1 |
| 2013/0049327 A1 * | 2/2013 | Bowe | B60D 1/64 | 280/422 |
| 2013/0056959 A1 * | 3/2013 | Mathes | B62D 21/152 | 280/504 |
| 2013/0193670 A1 * | 8/2013 | Columbia | B60D 1/52 | 280/495 |
| 2013/0277945 A1 * | 10/2013 | McCoy | B60D 1/485 | 280/495 |

FOREIGN PATENT DOCUMENTS

| | | | | |
|---|---|---|---|---|
| DE | 19711535 C2 * | 7/2003 | | B60D 1/06 |
| DE | EP 1886846 A1 * | 2/2008 | | B60D 1/52 |
| DE | 102006059252 A1 * | 6/2008 | | B60D 1/52 |
| DE | 102009018019 A1 * | 10/2010 | | B60D 1/06 |
| DE | EP 2692554 A1 * | 2/2014 | | B60D 1/52 |
| FR | 2983782 A1 * | 6/2013 | | B28C 5/1856 |
| IT | EP 0646482 B1 * | 7/2001 | | B60D 1/06 |
| LI | EP 1101634 A1 * | 5/2001 | | B60D 1/52 |

* cited by examiner

MECHANICAL COUPLING (HITCH) DEVICE FOR USE IN VEHICLES FOR TOWING TRAILERS

The present utility model describes a constructive arrangement in mechanical coupling device applied in vehicles for tow traction. More specifically, a device provided for a set of fixed parts through screws allowing the specific components replacement without the need of changing the entire system, besides showing a system allowing the fit and the removal of the end cap with extreme speed, quickness and safety. Thus, reducing the number of components and facilitating the equipment maintenance and installation.

The mechanical coupling devices for tow traction, commonly known as tow coupling, are devices fixed in the automobiles rear part aiming to enable the user to move the tows through the vehicle traction.

Currently, the tow couplings used show several difficulties to the users, such as the time and form of removing the end cap and the assembling process and the set elements maintenance, due to the system is composed of welded metallic structures, resulting in several drawbacks to users.

In addition, the previous systems hampered the installation process, making the adaptations necessary as the vehicle and the use of two or more people in the installation.

In this way, it is the object of the present utility model a constructive arrangement in mechanical coupling device applied in vehicles for tow traction comprising a device provided for a set of fixed parts through screws allowing the specific components replacement without the need of change the entire system, besides showing a system allowing the fit and the removal of the end cap with extreme speed, quickness, and safety. Thus, by reducing the number of components and facilitating the equipment installation and maintenance.

Such characteristics promote the simplicity and the smaller probability of faults during its shelf life when compared with the products of the state of the art.

It is the utility model's characteristic a constructive arrangement in mechanical coupling device applied in vehicles for tow traction provided for moving components fixed by screws.

It is the utility model's characteristic a constructive arrangement in mechanical coupling device applied in vehicles for tow traction provided for a fastening system allowing the change of specific parts without the need of disassembling the entire equipment.

It is the utility model's characteristic a constructive arrangement in mechanical coupling device applied in vehicles for tow traction providing a coupling system showing a reduction in the number of parts.

It is the utility model's characteristic a constructive arrangement in mechanical coupling device applied in vehicles for tow traction providing a system of easy manufacture, installation, and maintenance.

It is the utility model's characteristic a constructive arrangement in mechanical coupling device applied in vehicles for tow traction provided for a fast fit system of the end cap in the bracket with semi-automatic locking provided of lock and pressure key.

It is the utility model's characteristic a constructive arrangement in mechanical coupling device applied in vehicles for tow traction provided for a fast fit mechanism between the bracket and the end cap performed by rotation.

It is the utility model's characteristic a constructive arrangement in mechanical coupling device applied in vehicles for tow traction provided for an anti-noise system between the end cap and the bracket manufactured in thermoplastic material.

It is the utility model's characteristic a constructive arrangement in mechanical coupling device applied in vehicles for tow traction provided for components of fast fit locked in the counterpart.

It is the utility model's characteristic a constructive arrangement in mechanical coupling device applied in vehicles for tow traction provided for an anti-theft system performing the end cap locking in the coupling through a lock driven by pressure with opening through key.

It is the utility model's characteristic a constructive arrangement in mechanical coupling device applied in vehicles for tow traction provided for components manufactured by the casting process or other process allowing the manufacture with random surfaces.

It is the utility model's characteristic a constructive arrangement in mechanical coupling device applied in vehicles for tow traction provided with ball manufactured in stainless material.

In order to better describe the technical characteristics of the constructive arrangement in mechanical coupling device applied in vehicles for tow traction, the related following figures are showed.

Figure 1:
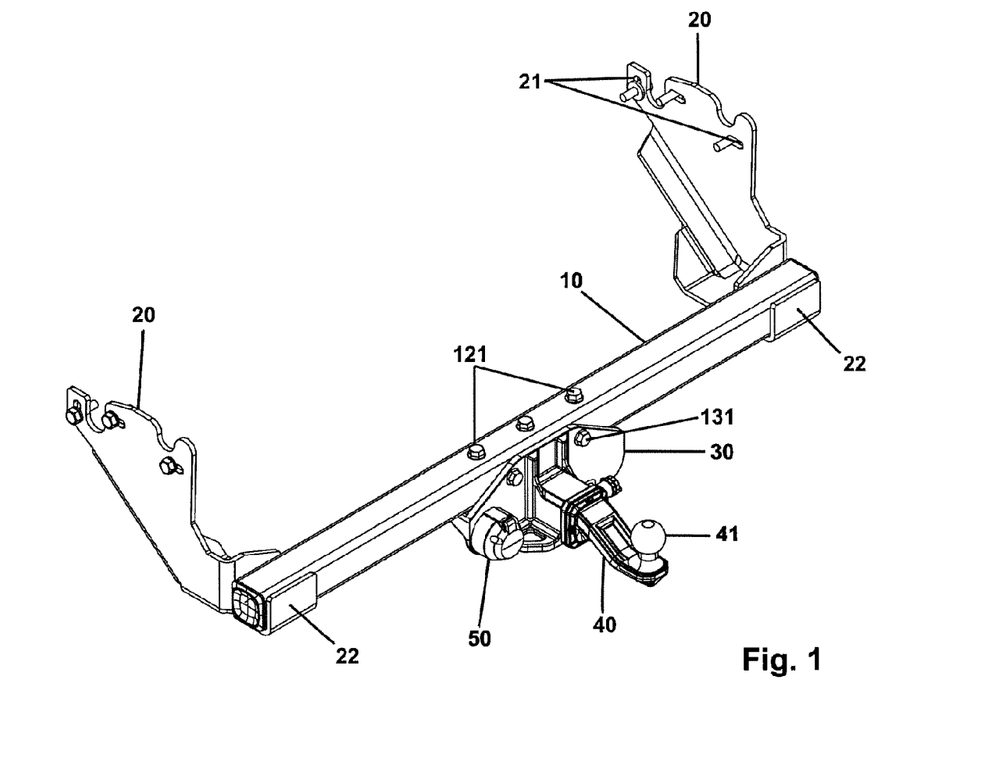
FIG. 1 shows the perspective view of the mechanical coupling device applied in vehicles for tow traction.
Figure 2:
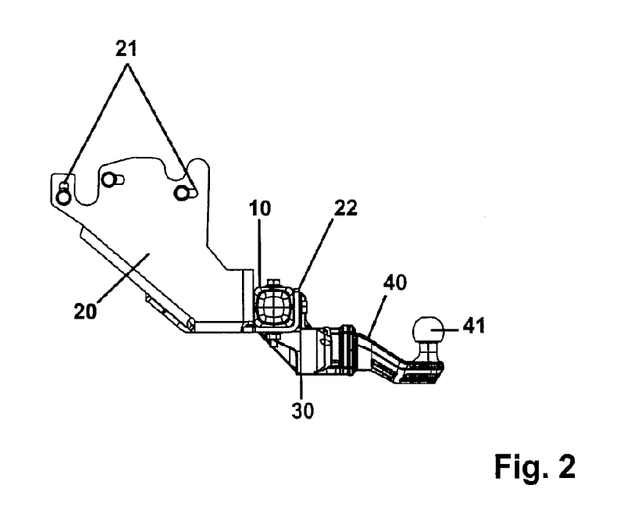
FIG. 2 shows the side view of the mechanical coupling device applied in vehicles for tow traction.
Figure 3:
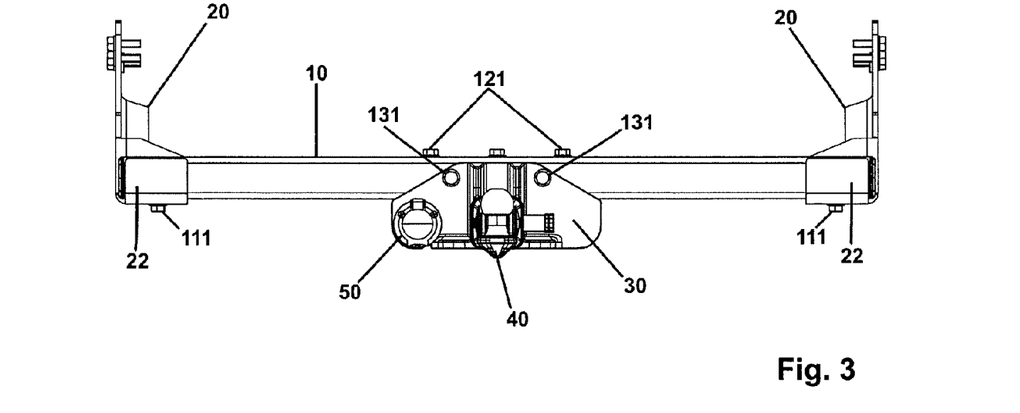
FIG. 3 shows the front view of the mechanical coupling device applied in vehicles for tow traction.
Figure 4:
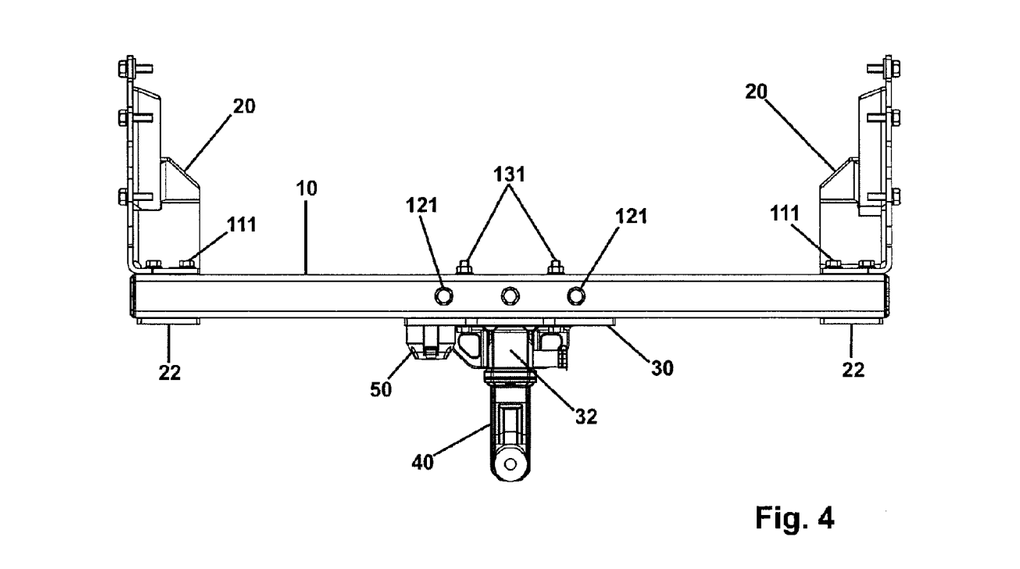
FIG. 4 shows the upper view of the mechanical coupling device applied in vehicles for tow traction.
Figure 5:
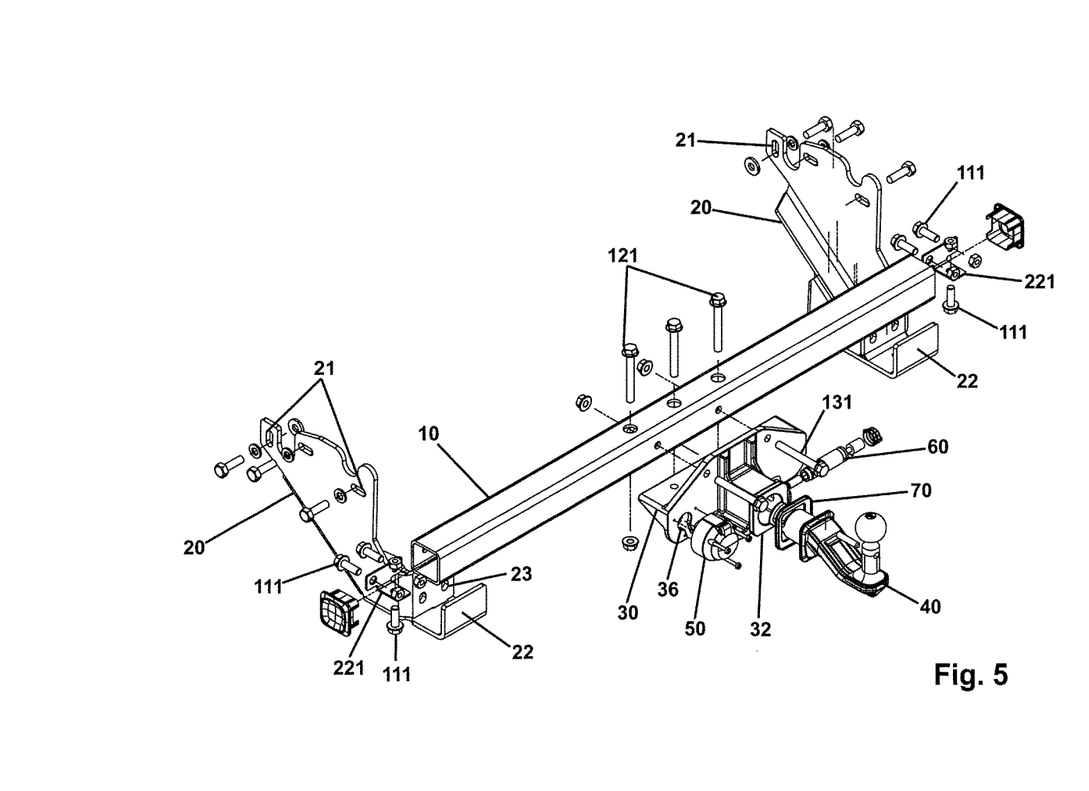
FIG. 5 shows the exploded view of the mechanical coupling device applied in vehicles for tow traction.

The constructive arrangement in mechanical coupling device applied in vehicles for tow traction, object of the present utility model, comprises a square tubular structure (10) arranged horizontally provided in its ends by through-holes (11) receiving the fastening fitting structures (20) next to the vehicle chassis, said square tubular structure (10) showing a set of fastening through-holes (12) in the central portion of a "T"-shaped structure (30) enabling the fit of an end cap (40) in sinuous shape.

Figure 6:
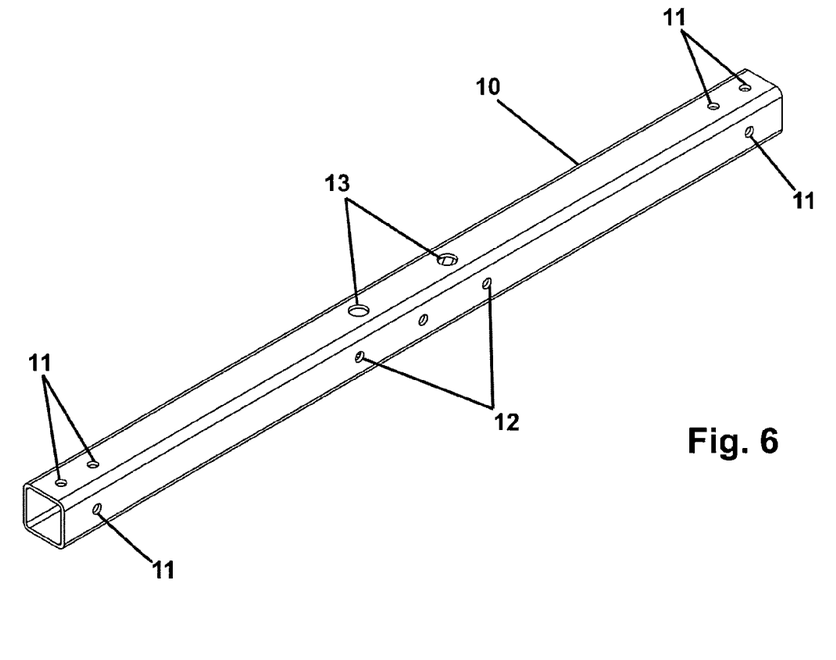
FIG. 6 shows the perspective view of the square tubular structure.

The square tubular structure (10) shows in its ends through-holes (11) allowing the fastening of fitting structures (20) through the screw and the nut (111), said structure (10) showing in the central portion a trio of through-holes (12) arranged in the upper face receiving the screws (121) and a pair of through-holes (13) receiving the screws (131) arranged in the structure front face (10), fitting with the "T"-shaped structure (30).

The fastening fit structure (20) next to the vehicle chassis shows a set of through-holes (21) enabling the fastening of fit screws next to the vehicle, said structure (20) showing a spacing (22) in "U" or "L"-shape, according to the type and model of the vehicle, provided for through-holes (23) enabling to fit the square tubular structure (10) and its fastening through the screws (111).

The spacing (22) receives a fastening structure (221) aiding in the screws fastening (111), ensuring greater resistance.

Figure 7:
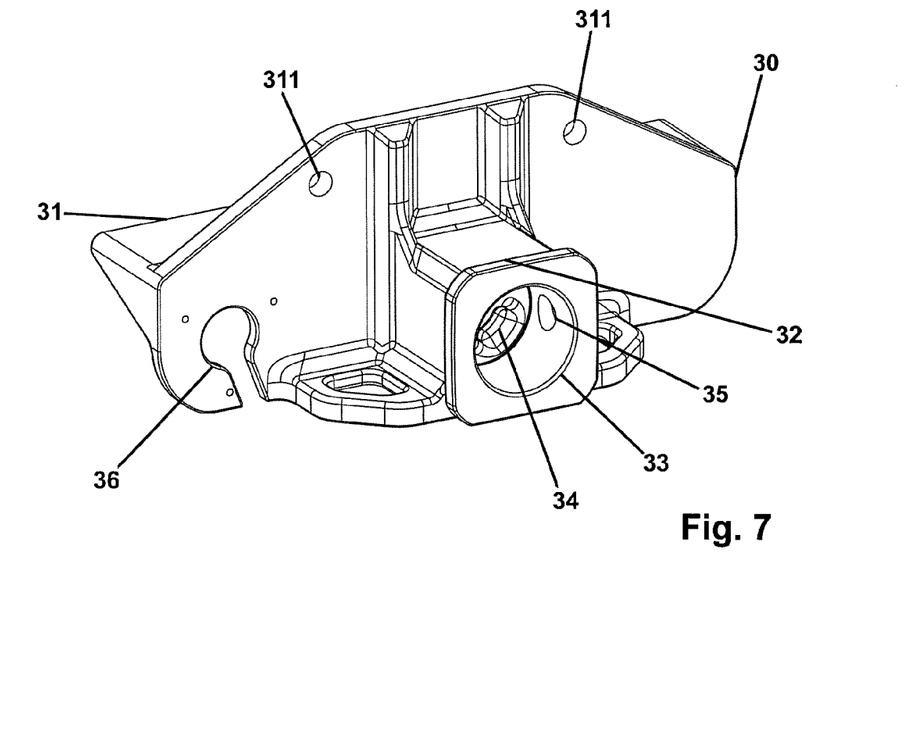
FIG. 7 shows the perspective view of the "T"-shaped structure.

The "T"-shaped structure (30) shows a "L"-spacing (31) in the rear portion provided for a set of through-holes (311) next to the spacing faces (31), said spacing (31) fitting next to the tubular structure (10) by fastening the screws (121) next to the through-holes (12) and screws (131) next to the through-holes (131) arranged in the tubular structure (10).

Figure 8:
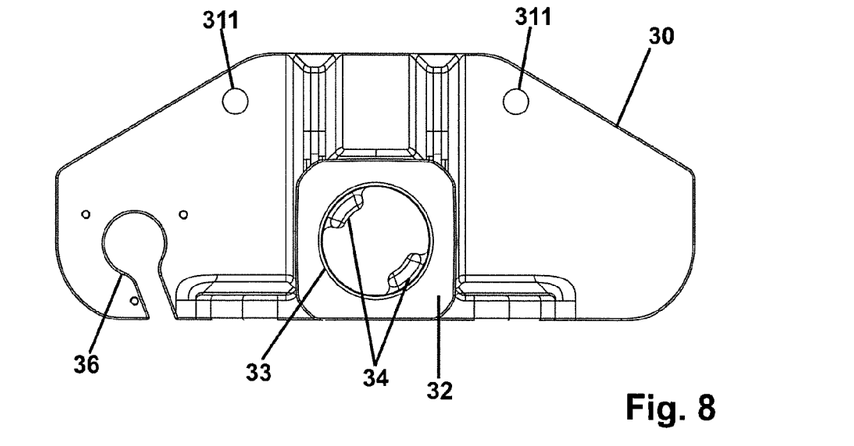
FIG. 8 shows the front view of the "T"-shaped structure.
Figure 9:
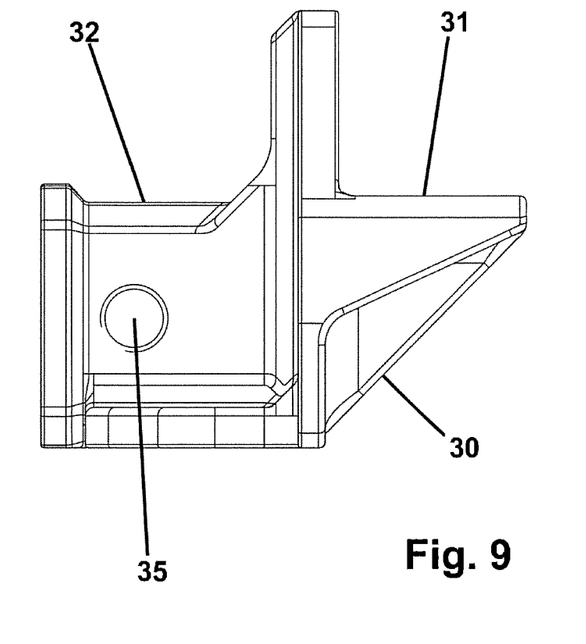
FIG. 9 shows the side view of the "T"-shaped structure detailing the locking hole.

The structure (30) shows in its front portion a projection (32) showing a circular spacer (33) and internally describes the vertical projections arrangement (34) that promote the end cap (40) locking, the said projection (32) showing a locking through-hole (35) through the anti-theft system or pin next to the end cap (40).

The "T"-shaped structure (30) described in its front portion a spacing (36) of the wall outlet arrangement (50) interconnected to the vehicle main cabling.

Figure 10:
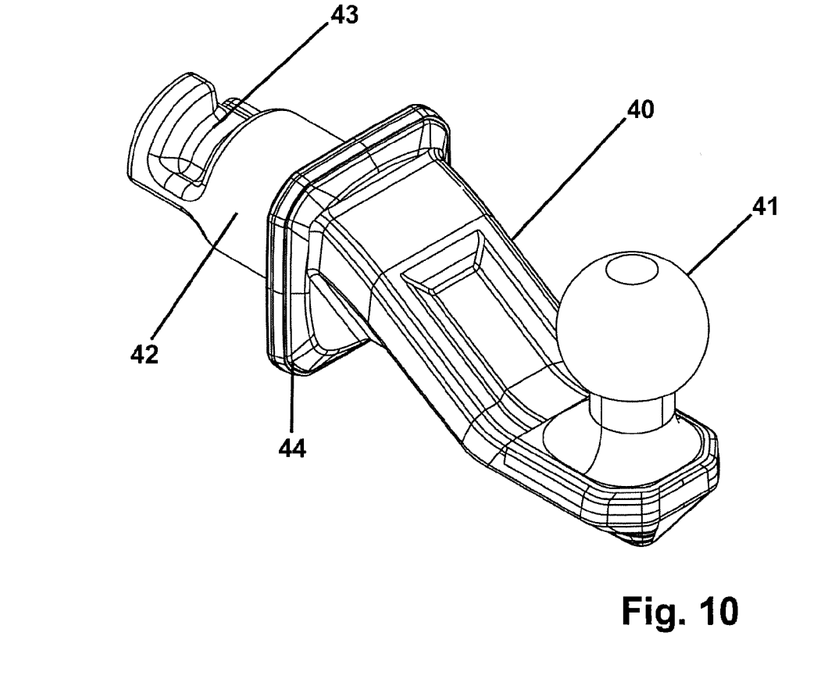
FIG. 10 shows the perspective view of the end cap.
Figure 11:
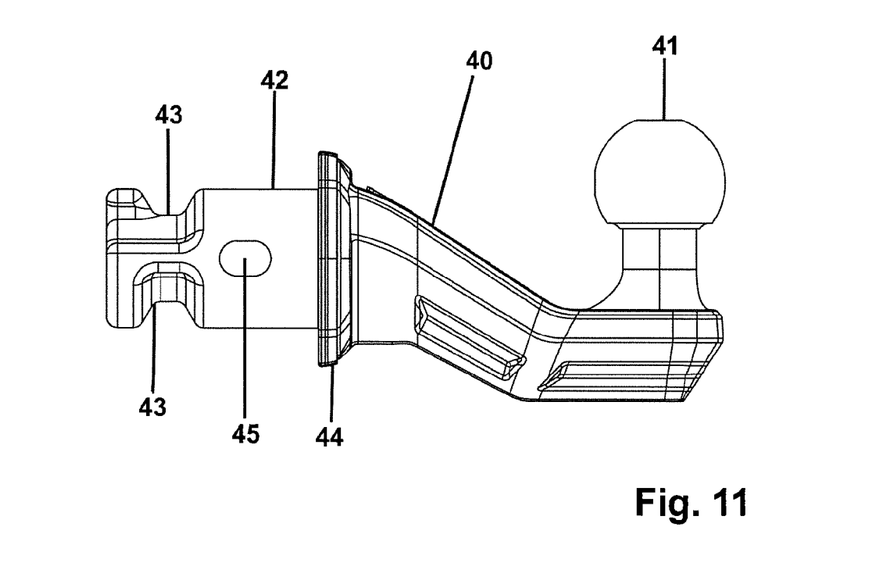
FIG. 11 shows the side view of the end cap.
Figure 12:
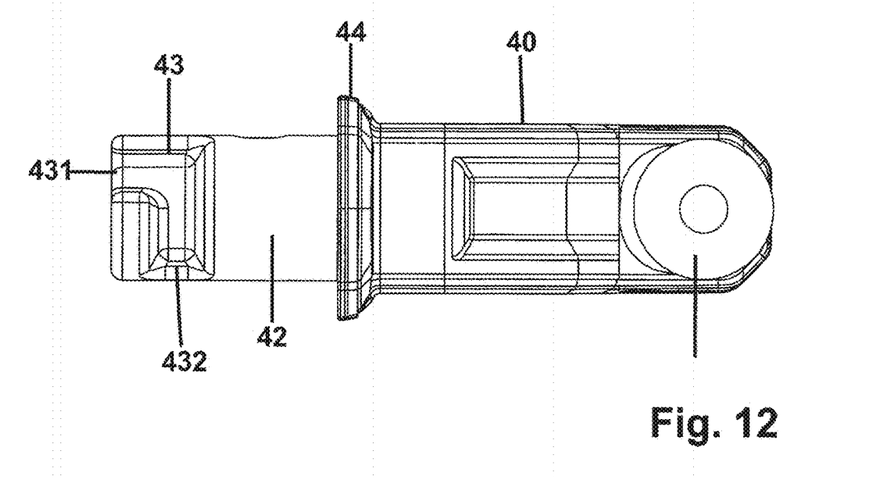
FIG. 12 shows the upper view of the end cap.

The end cap (40) in sinuous shape shows in one of its ends the ball (41) arrangement facilitating the tow fit next to the device, in the rear end of the end cap (40) a circular structure (42) is described provided with grooves (43) and projected from a square structure (44) arranged in the central portion of the end cap (40), said square structure (44) allowing the perfect fit of the end cap (40) next to the structure (30).

The grooves (43) arranged in the structure (42) show a "L"-shape allowing the end cap locking (40) next to vertical projections (34) arranged next to the structure (30).

The grooves (43) showing a "L"-shape allow the end cap (40) be fitted next to the projections (34) of the structure (30), ensuring the projections (34) to be locked next to the grooves (43) when fitting and rotating the end cap (40) next to the structure (30).

The grooves (43) in "L" shape are arranged in the upper and lower face of the circular structure (42) and show an opening (431) next to the structure end (42) and closing (432) that functions as fit limiting guide of the end cap (40).

The circular structure (42) shows a sizing compatible with circular spacer (33) described next to the projection (32) of the structure (30), allowing the perfect fit between the end cap (40) and the structure (30).

The circular structure (42) shows in one of its faces a cavity (45) functioning as fit of the anti-theft system.

The end cap (40) to be arranged next to the structure (30) needs to be rotated in such a way the pin where is fitted the ball (41) is arranged in the horizontal portion, allowing the opening (431) of the groove (43) to receive the structure projections (34), performing the fast fit by rotating the end cap (40).

Figure 13:
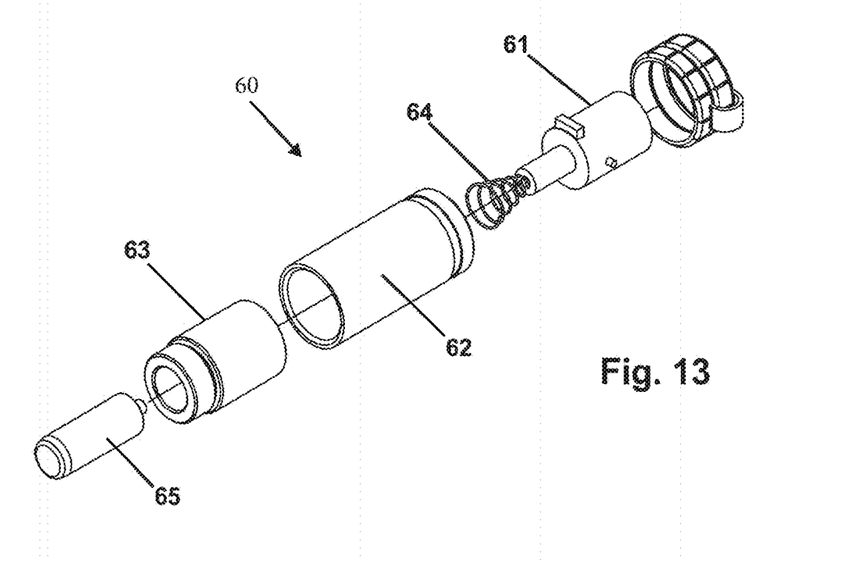
FIG. 13 shows the exploded view of the anti-theft system.

The end cap (40) after fitted next to the structure (30) enables the locking through the anti-theft system (60) or fastening pin, disabling the undue removal of this component.

The anti-theft system (60) shows a lock core (61) that is inserted into a cylindrical structure (62) with thread in one of its ends, being threaded and locked next to the threaded pin (63) for compressing a conical spring (64) when driven the lock core (61). The other end of the threaded pin (63) has a hole serving as guide for a pin (65) threaded and locked in the end of the lock core (61) and that when driven it is coupled to the cavity (45), ensuring the end cap locking (40).

The anti-theft system (60) components are fixed among each other by threading, show a thread lock liquid for preventing the system violation.

The anti-theft system (60) is arranged in the through-hole (35) of the structure (30), said anti-theft system (60) that is manufactured in stainless steel or with chrome finish, preventing its oxidation.

Additionally, the present utility model has an anti-noise system (70) integrated between the square structure (44) of the end cap (40) and the projection (32) of the structure (30).

In this way, the constructive arrangement in mechanical coupling device applied in vehicles for tow traction, object of the present utility model, described technical improvements by reducing the number of parts, simplifying the constructive process and fast coupling system between the bracket and the end cap, facilitating the use, manufacture, installation and maintenance of the equipment.

The invention claimed is:

1. A mechanical coupling device, comprising:
a square tubular structure arranged horizontally and provided with fastening through-holes ends next to fitting structures, the fitting structures including fastening through-holes and spacers;
a "T"-shaped structure centrally located on the square tubular structure, the "T"-shaped structure having an "L" spacer in a rear portion, the "T"-shaped structure having in a front portion an end cap receiving projection, the end cap receiving projection including a circular spacer that defines an opening of an aperture having locking inner radial projections and a locking through-hole for receiving an anti-theft system;
an end cap having a front end and a rear end, wherein the front end includes a ball and the rear end includes a tubular structure provided with first and second grooves, the tubular structure projecting away from a square structure arranged in a central portion of the end cap, between the front end and the rear end;
wherein the anti-theft system includes a lock core configured to be inserted into a cylindrical structure, wherein the cylindrical structure has a thread in a first end, and wherein the anti-theft system further includes a threaded pin configured to compress a conical spring when the lock core is driven, an end of the threaded pin having a hole for guiding a threaded and locked pin in an end of the lock core;
wherein the end cap is configured to be rotatably attachable and detachable to the "T"-shaped structure via mating of the locking inner radial projections of the aperture with the first and second grooves of the tubular structure.

2. The mechanical coupling device according to claim 1, wherein at least one of the spacers of the fitting structures receives a fastening structure.

3. The mechanical coupling device according to claim 1, wherein the first and second grooves are "L"-shaped and arranged in upper and lower faces of the tubular structure, which define an opening that provides a fit limiting guide of the end cap, relative to the "T"-shaped structure.

4. The mechanical coupling device according to claim 1, wherein the locking through-hole is aligned with a cavity in the end cap that receives the locking anti-theft system.

5. The mechanical coupling device according to claim 1, further comprising an anti-noise system integrated between the square structure of the end cap and the end cap receiving projection.

6. The mechanical coupling device according to claim 1, wherein the anti-theft system is made of one or more of the following for preventing oxidation: stainless steel and chrome finish.

7. The mechanical coupling device according to claim 1, wherein the ball is made of stainless material.

8. The mechanical coupling device according to claim 1, wherein the square tubular structure is fixed to the fitting structures and said "T"-shaped structure with screws.

\* \* \* \* \*